Nov. 14, 1933.  F. O. SNOW, JR  1,935,581
FRICTION CLUTCH
Filed Nov. 8, 1929   2 Sheets-Sheet 1

Inventor:
Frederick O. Snow, Jr.,
by Emery, Booth, Varney & Townsend
Att'ys.

Nov. 14, 1933.  F. O. SNOW, JR  1,935,581
FRICTION CLUTCH
Filed Nov. 8, 1929  2 Sheets-Sheet 2

Inventor:
Frederick O. Snow, Jr.,
by Emery Booth Varney & Townsend
Attys.

Patented Nov. 14, 1933

1,935,581

UNITED STATES PATENT OFFICE 1,935,581

FRICTION CLUTCH

Frederick O. Snow, Jr., Winchester, Mass., assignor to Mead-Morrison Manufacturing Company, East Boston, Mass., a corporation of Maine Application November 8, 1929. Serial No. 405,650

4 Claims. (Cl. 192—69)

This invention relates to a novel and improved friction clutch, and will be best understood by reference to the following description, when taken in connection with the accompanying drawings of one specific embodiment thereof, while its scope will be more particularly pointed out in the appended claims:—

Figure 1:
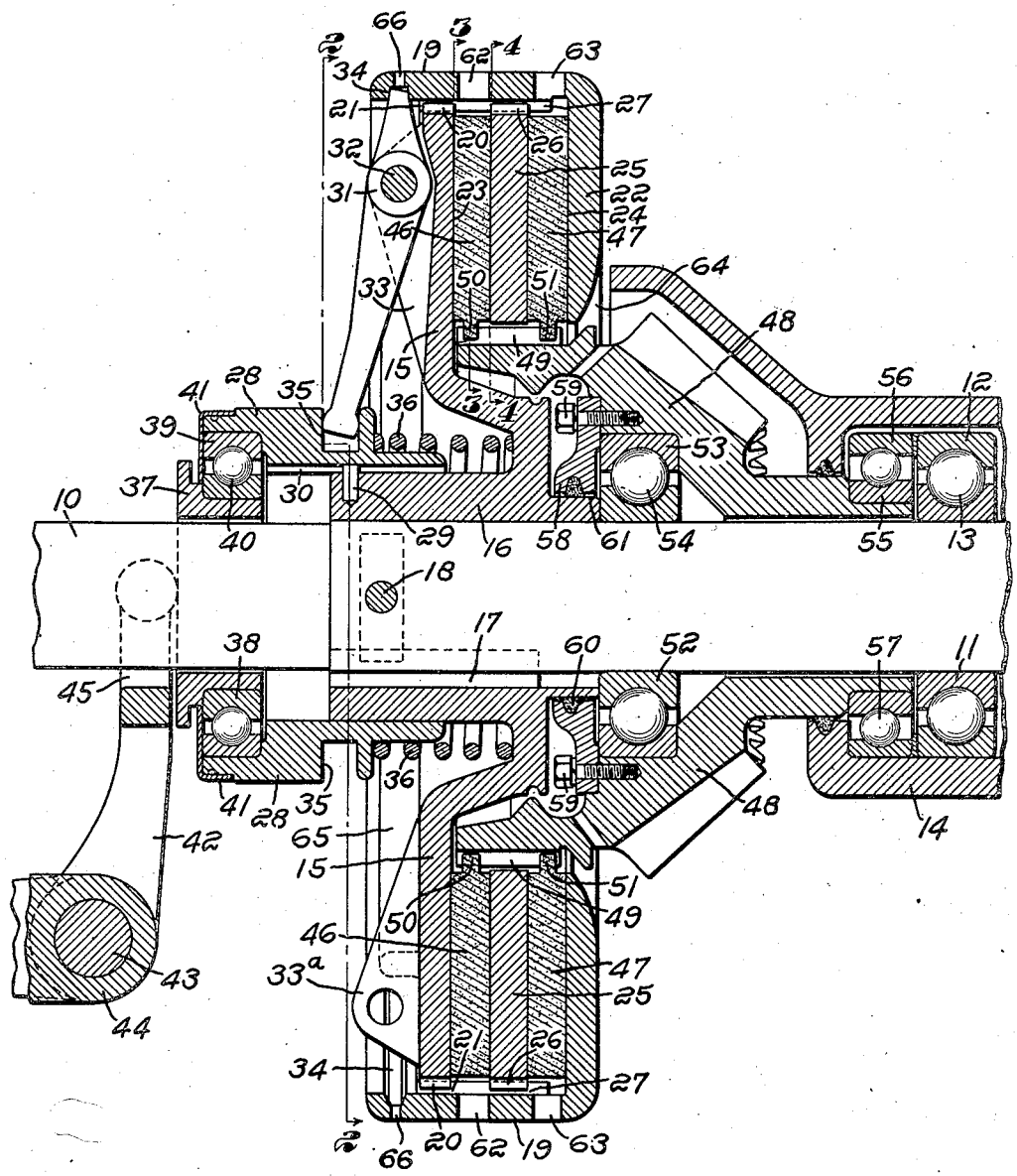
Fig. 1 is a sectional view of the clutch in a plane containing its axis of rotation.
Figure 2:
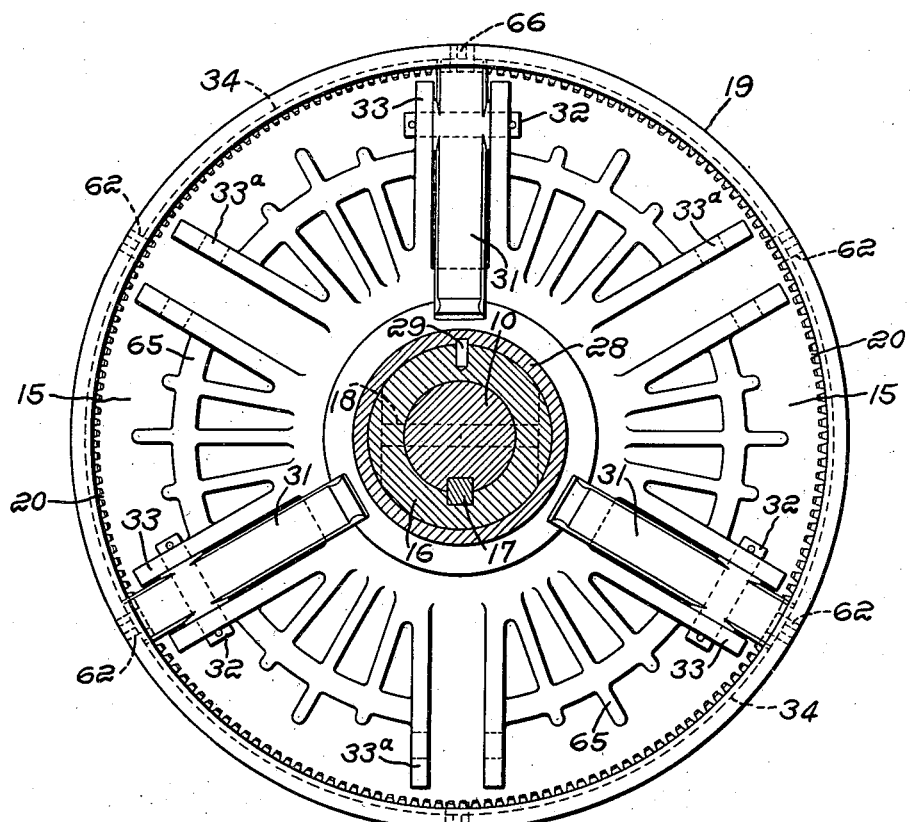
Fig. 2 is a sectional view at a reduced scale on line 2—2 of Fig. 1.
Figure 3:
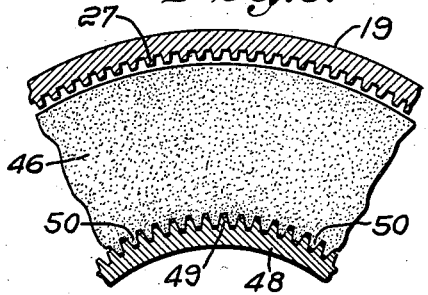
Fig. 3 is a sectional view on line 3—3 of Fig. 1.
Figure 4:
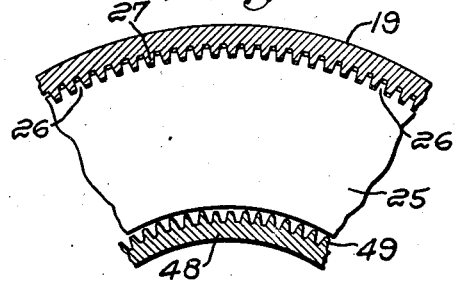
Fig. 4 is a sectional view on line 4—4 of Fig. 1.

Referring to the drawings, and to the embodiment of the invention which is illustrated therein, there is shown a clutch comprising a driving shaft 10, supported in appropriate bearings, one of which is shown, the same comprising inner and outer grooved ball races 11 and 12, and a set of balls 13, the inner race contacting with the shaft and the outer race being supported in a casing 14. While the shaft in practice has one or more other bearings, it is deemed unnecessary to illustrate them herein.

The driving unit comprises, in addition to the shaft, a driving member which, as shown in the drawings, is a disk 15, having a hub 16 which is suitably secured as by a key 17 and a pin 18 to the shaft. The driving unit also comprises a ring 19, movable axially with relation to the disk 15, and having a driving connection therewith, such as splines or teeth 20 on the disk, meshing with similar splines or teeth 21 on the ring. A second friction disk 22 is carried by the ring, and herein is conveniently formed as an integral part thereof. The two disks have friction faces 23 and 24, respectively, which face each other. The driving unit, as herein shown, comprises a third friction disk 25, interposed between and movable axially with relation to the first and second disks, and having a driving connection with the ring, as by providing the disk 25 with splines or teeth 26, meshing with corresponding teeth 27 on the ring.

The driving unit further includes a sleeve 28, which is movable axially with relation to the driving disk 15, and is conveniently supported by the hub 16 of the latter. There is a suitable driving connection between the sleeve and the hub, herein a radially disposed pin 29, carried by the hub and received in a longitudinal groove 30 presented by the sleeve. Axial movement is communicated from the sleeve 28 to the ring 19, as by a plurality of levers 31, herein three in number, each fulcrumed intermediate its ends on a pin 32 between ears 33 formed on the disk 15. The outer end of each lever is received in an annular groove 34 in the ring 19, and the inner end in an annular groove 35 presented by the sleeve 28. Thus axial movement of the sleeve in one direction is accompanied by axial movement of the ring in the opposite direction. As herein shown, the clutch is engaged by an external force applied to the sleeve 28 to move the latter in an inward direction (toward the right in Fig. 1), while disengagement is effected by a spring 36 interposed between the sleeve 28 and the disk 15.

A thrust collar 37 is connected to the sleeve 28 by a thrust bearing, herein comprising inner and outer grooved ball races 38 and 39, and a set of balls 40. A sheet metal cap 41, secured to the sleeve and overlying the outer end of the ball bearing, excludes foreign matter from and retains lubricant within the bearing. The thrust collar is supported by the sleeve, and has no engagement with the shaft.

From the foregoing, it is evident that the described parts which constitute the driving unit derive their support from the shaft, and yet the only one which engages the shaft is the disk 15, whose hub is secured to the shaft. The advantage of this is that the thrust collar is self-contained with the rotating clutch member, and the rotating parts constitute a unit, so that all thrusts applied to the clutch are received by the disk 15 and transmitted directly to the shaft 10, axial movement of which is prevented by the bearing comprising the parts 11, 12, 13 and 14. The force which is applied to effect engagement of the clutch is transmitted to the thrust collar 37 by a bell-crank lever 42, which is mounted on a pivot 43, on a support 44, and is forked to provide arms 45, which engage the outer end of the thrust collar.

The driven unit comprises two friction disks 46 and 47, which are capable of axial movement, and are disposed at opposite sides, respectively, of the disk 25, and between the latter and the disks 15 and 22. In practice, the disks 46 and 47 are composed of a molded material, including asbestos, which has a proper coefficient of friction, and does not become readily heated. The driven unit also comprises a driven member 48, having suitable driving connection with the disks 46 and 47, as by providing the member 48 with teeth or splines 49, meshing with similar teeth or splines 50 and 51, presented by the disks 46 and 47, respectively. The driven member is supported partly by the shaft 10 and partly by the bearing casing 14. For this purpose, there are two ball bearings, one comprising inner and outer grooved ball races 52 and 53, and a set of balls 54, and the other inner and outer grooved ball races 55 and 56, and a set of balls 57. A ring 58, secured to the driven member 48 as by screws 59, carries an oil retaining felt ring 60, which bears against a hub 61 presented by the driving disk 15, and thus prevents the escape of lubricant from the adjacent bearing.

When the thickness of the disks 46 and 47 has become very considerably reduced by wear, compensation for the wear may be made by removing the pivotal pins 32 of the levers 31, and shifting the latter to a second set of ears 33a, which present axes farther from the friction face 23. This is a convenient and practical substitute for providing an adjustable take-up in connection with the sleeve 28 and the thrust collar 37.

The ring 19 is provided with two sets of holes 62 and 63 to permit the escape of warm air by centrifugal force, due to the continuous rotation of the driving unit. In fact, the arrangement is such that cool air from the outside is admitted through a space 64 to the inner peripheral surfaces of the disks 25, 46 and 47, and when the clutch is disengaged, there is sufficient separation of the disks to permit this air to pass radially outward to and through the openings 62 and 63. Additional cooling is effected by providing the outer face of the driving disk 15 with appropriate ribs 65 to radiate the heat. Any undue amount of oil which might accumulate in the groove 34 in the ring 19 is permitted to escape by providing the latter with one or more openings 66.

The general operation of the clutch should be evident without further description. The clutch possesses several important advantages,—one is the fact that the thrust is self-contained, and thus avoids the necessity of a yoke. Another is the rapid dissipation of heat, because all of the parts are arranged to conduct the heat from the driven member to the outer surfaces of the rotating driving member, where the heat will be dissipated quickly, particularly owing to the fact that the driving unit is continuously rotated. Another advantage of the construction is that the clutch is operated by levers instead of toggles, as a result of which the clutch can be slipped to take up the load gradually, because, owing to the direct action, the operator can feel the engagement of the clutch, and can sense just how the load is being taken up. By the use of the levers, the force which is applied in engaging the clutch is exactly proportional to the force which the operator employs with his hand or foot, whichever the case may be. If desired, the clutch may be simplified by reduction of the number of disks.

Having thus described one embodiment of the invention, but without limiting myself thereto, what I claim and desire by Letters Patent to secure is:

1. In a friction clutch, the combination of a driving unit comprising a shaft, a disk secured to said shaft and having a friction face, a ring movable axially with relation to said disk and provided with an annular groove and with one or more ventilating openings, means affording a driving connection between said disk and said ring, a second disk carried by said ring and having a friction face which faces toward the first friction face, a third disk interposed between and movable axially with relation to the first and second disks, means affording a driving connection between said third disk and said ring, an axially movable sleeve provided with an annular groove, means affording a driving connection between said sleeve and the first disk, a plurality of levers pivoted on the first disk and having one set of ends received in said annular groove of said ring and second set of ends received in said annular groove of said sleeve, a thrust collar, a thrust bearing connecting said thrust collar to said sleeve, and a spring interposed between the first disk and said sleeve and tending to move the latter axially from the first disk; means engaging said thrust collar to move said sleeve axially toward the first disk in opposition to said spring; and a driven unit comprising two axially movable driven disks at opposite sides, respectively, of the third disk and between the latter and the first and second disks, a driven member, and means affording a driving connection between said driven member and said driven disks.

2. In a friction clutch, the combination of a driving unit and a driven unit; said driving unit comprising a shaft, a disk secured to said shaft and having a friction face, a ring movable axially with relation to said disk, means affording a driving connection between said disk and said ring, a second disk carried by said ring and having a friction face which faces toward the first friction face, and operating mechanism for moving said ring axially; said driven mechanism comprising a driven member about said shaft, a third disk axially movable and interposed between the first and second-mentioned disks, and means affording a driving connection between said third disk and said driven member; and a thrust bearing which holds said shaft and the first-mentioned disk against axial movement.

3. In a friction clutch, the combination of a driving unit and a driven unit; said driving unit comprising a shaft, a disk secured to said shaft and having a friction face, a ring movable axially with relation to said disk, means affording a driving connection between said disk and said ring, a second disk carried by said ring and having a friction face which faces toward the first friction face, and operating mechanism for moving said ring axially; said driven mechanism comprising a driven member about said shaft, a third disk axially movable and interposed between the first and second-mentioned disks, and means affording a driving connection between said third disk and said driven member; and a thrust bearing which holds said shaft and the first-mentioned disk against axial movement, said driven member being between said thrust bearing and the first-mentioned disk.

4. In a friction clutch, the combination of a driving unit and a driven unit; said driving unit comprising a shaft, a disk secured to said shaft and having a friction face, a ring movable axially with relation to said disk, means affording a driving connection between said disk and said ring, a second disk carried by said ring and having a friction face which faces toward the first friction face, and operating mechanism for moving said ring axially; said operating mechanism comprising a sleeve, levers connecting said sleeve to said ring to cause movement of said sleeve in one direction to impart movement to said ring in the opposite direction, a spring interposed between said sleeve and the first-mentioned disk and tending to move said sleeve axially from the first-mentioned disk, and means to move said sleeve axially toward the first-mentioned disk in opposition to said spring.

FREDERICK O. SNOW, Jr.